(12) United States Patent
Ellifson et al.

(10) Patent No.: US 12,618,446 B2
(45) Date of Patent: \*May 5, 2026

(54) DAMPER ASSEMBLY

(71) Applicant: Oshkosh Defense, LLC, Oshkosh, WI (US)

(72) Inventors: Erik Ellifson, Oshkosh, WI (US); Darin Rosenboom, Sheldon, IA (US)

(73) Assignee: OSHKOSH DEFENSE, LLC, Oshkosh, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/841,158

(22) Filed: Jun. 15, 2022

(65) Prior Publication Data

US 2022/0307566 A1      Sep. 29, 2022

Related U.S. Application Data

(63) Continuation of application No. 17/462,924, filed on Aug. 31, 2021, now Pat. No. 11,378,148, which is a (Continued)

(51) Int. Cl.
*F16F 9/32*          (2006.01)
*B60G 3/20*          (2006.01)
(Continued)

(52) U.S. Cl.
CPC .............. *F16F 9/3214* (2013.01); *B60G 3/20* (2013.01); *B60G 21/067* (2013.01);
(Continued)

(58) Field of Classification Search
CPC .. F16F 9/063; F16F 9/065; F16F 9/062; F16F 9/14; F16F 9/16; F16F 9/182; F16F 9/22;
(Continued)

(56) References Cited

U.S. PATENT DOCUMENTS

| | | | | |
|---|---|---|---|---|
| 2,946,582 | A | | 7/1960 | Martin |
| 3,222,049 | A | * | 12/1965 | Tuczek ................... F16F 9/092 |
| | | | | 267/64.17 |

(Continued)

FOREIGN PATENT DOCUMENTS

| | | | | |
|---|---|---|---|---|
| DE | 3932287 | A * | 4/1991 | ............. B60G 15/12 |
| DE | 40 03 200 | | 8/1991 | |

(Continued)

OTHER PUBLICATIONS

International Search Report and Written Opinion for International Application No. PCT/US2012/028553, mail date Jun. 25, 2012, 9 pages.

*Primary Examiner* — Melody M Burch
(74) *Attorney, Agent, or Firm* — FOLEY & LARDNER LLP

(57)          ABSTRACT

A damper assembly includes an outer cylinder, an inner cylinder positioned at least partially within the outer cylinder, a cap coupled to the inner cylinder, and a plunger positioned radially inward from the inner cylinder and coupled to a rod. The plunger, the cap, and an interior of the inner cylinder at least partially define a first chamber. The suspension system further includes a passage extending through the rod and fluidly coupled with the first chamber, a piston coupled to the inner cylinder and extending radially outward toward the outer cylinder, a first port in fluid communication with the plunger, the cap, and the inner cylinder through the passage, and a second port in fluid communication with the piston, the inner cylinder, and the outer cylinder. The piston, an exterior surface of the inner cylinder, and the outer cylinder at least partially define a second chamber.

20 Claims, 8 Drawing Sheets

Related U.S. Application Data continuation of application No. 16/517,209, filed on Jul. 19, 2019, now Pat. No. 11,209,067, which is a continuation of application No. 15/707,675, filed on Sep. 18, 2017, now Pat. No. 10,422,403, which is a continuation of application No. 14/846,600, filed on Sep. 4, 2015, now Pat. No. 9,765,841, which is a continuation of application No. 13/047,648, filed on Mar. 14, 2011, now Pat. No. 9,127,738.

(51) Int. Cl.

| | |
|---|---|
| *B60G 21/067* | (2006.01) |
| *B60G 21/073* | (2006.01) |
| *F16F 9/06* | (2006.01) |
| *F16F 9/36* | (2006.01) |

(52) U.S. Cl.

CPC ............ *B60G 21/073* (2013.01); *F16F 9/062* (2013.01); *F16F 9/063* (2013.01); *F16F 9/368* (2013.01); *B60G 2200/14* (2013.01); *B60G 2204/45* (2013.01); *B60G 2206/12* (2013.01); *B60G 2206/124* (2013.01); *B60G 2206/41* (2013.01)

(58) Field of Classification Search

CPC .......... F16F 9/28; F16F 9/3235; F16F 9/3214; F16F 9/325; F16F 9/3257; F16F 9/368; B60G 17/04; B60G 17/056; B60G 17/08; B60G 21/073; B60G 2202/154; B60G 2202/15; B60G 2202/24; B60G 15/12; B60G 3/20; B60G 2206/41; B60G 2206/124; B60G 2206/12; B60G 2204/45; B60G 2200/14; B60G 21/067

See application file for complete search history.

(56) References Cited

U.S. PATENT DOCUMENTS

| | | | | |
|---|---|---|---|---|
| 3,417,985 | A | 12/1968 | Hannan | |
| 3,837,444 | A * | 9/1974 | Allinquant | F16F 9/092 |
| | | | | 188/269 |
| 4,445,672 | A | 5/1984 | Turiot | |
| 4,606,551 | A * | 8/1986 | Toti | B60G 21/06 |
| | | | | 280/124.161 |
| 4,752,062 | A * | 6/1988 | Domenichini | B60G 21/073 |
| | | | | 188/315 |
| 5,031,732 | A * | 7/1991 | Batek | B60G 11/26 |
| | | | | 188/322.19 |
| 5,217,083 | A | 6/1993 | Bachhuber et al. | |
| 5,378,010 | A | 1/1995 | Marino et al. | |
| 5,417,299 | A | 5/1995 | Pillar et al. | |
| 5,538,274 | A | 7/1996 | Schmitz et al. | |
| 5,794,966 | A | 8/1998 | Macleod | |
| 5,820,150 | A | 10/1998 | Archer et al. | |
| 5,899,472 | A | 5/1999 | Burke et al. | |
| 6,086,074 | A | 7/2000 | Braun | |
| 6,092,816 | A | 7/2000 | Sekine et al. | |
| 6,105,984 | A | 8/2000 | Schmitz et al. | |

| | | | | |
|---|---|---|---|---|
| 6,516,914 | B1 | 2/2003 | Andersen et al. | |
| 6,520,494 | B1 | 2/2003 | Andersen et al. | |
| 6,561,718 | B1 | 5/2003 | Archer et al. | |
| 6,622,397 | B1 | 9/2003 | Knoble | |
| 6,764,085 | B1 | 7/2004 | Anderson | |
| 6,779,806 | B1 | 8/2004 | Breitbach et al. | |
| 6,860,332 | B1 | 3/2005 | Archer et al. | |
| 6,882,917 | B2 | 4/2005 | Pillar et al. | |
| 6,976,688 | B2 | 12/2005 | Archer et al. | |
| 7,073,620 | B2 | 7/2006 | Braun et al. | |
| 7,108,253 | B2 | 9/2006 | Venton-Walters et al. | |
| 7,140,461 | B2 | 11/2006 | Morrow | |
| 7,207,582 | B2 | 4/2007 | Siebers et al. | |
| 7,258,194 | B2 | 8/2007 | Braun et al. | |
| 7,357,203 | B2 | 4/2008 | Morrow et al. | |
| 7,389,826 | B2 | 6/2008 | Linsmeier et al. | |
| 7,392,122 | B2 | 6/2008 | Pillar et al. | |
| 7,441,638 | B2 * | 10/2008 | Hanawa | B62K 25/08 |
| | | | | 280/124.105 |
| 7,756,621 | B2 | 7/2010 | Pillar et al. | |
| 7,856,998 | B2 | 12/2010 | Bauer | |
| 7,874,373 | B2 | 1/2011 | Morrow et al. | |
| 7,878,750 | B2 | 2/2011 | Zhou et al. | |
| 8,333,390 | B2 | 12/2012 | Linsmeier et al. | |
| 8,459,619 | B2 | 6/2013 | Trinh et al. | |
| 8,465,025 | B2 | 6/2013 | Venton-Walters et al. | |
| 8,596,648 | B2 | 12/2013 | Venton-Walters et al. | |
| 8,764,029 | B2 | 7/2014 | Venton-Walters et al. | |
| 8,801,017 | B2 | 8/2014 | Ellifson et al. | |
| 8,821,130 | B2 | 9/2014 | Venton-Walters et al. | |
| 8,876,133 | B2 | 11/2014 | Ellifson | |
| 8,899,560 | B2 | 12/2014 | Allen et al. | |
| 8,947,531 | B2 | 2/2015 | Fischer et al. | |
| 8,991,834 | B2 | 3/2015 | Venton-Walters et al. | |
| 9,045,014 | B1 | 6/2015 | Verhoff et al. | |
| 9,127,738 | B2 | 9/2015 | Ellifson et al. | |
| 9,145,905 | B2 | 9/2015 | Hou | |
| 9,174,686 | B1 | 11/2015 | Oshkosh | |
| 9,765,841 | B2 | 9/2017 | Ellifson et al. | |
| 10,422,403 | B2 * | 9/2019 | Ellifson | F16F 9/062 |
| 11,209,067 | B2 * | 12/2021 | Ellifson | F16F 9/368 |
| 11,378,148 | B2 * | 7/2022 | Ellifson | F16F 9/368 |
| 2002/0030311 | A1 | 3/2002 | Beck et al. | |
| 2005/0087412 | A1 | 4/2005 | Schel | |
| 2006/0054435 | A1 * | 3/2006 | Yamaguchi | F16F 9/3485 |
| | | | | 188/322.19 |
| 2008/0111324 | A1 | 5/2008 | Davis | |
| 2009/0174158 | A1 | 7/2009 | Anderson et al. | |
| 2010/0116569 | A1 | 5/2010 | Morrow et al. | |
| 2010/0276906 | A1 | 11/2010 | Galasso et al. | |
| 2010/0289238 | A1 | 11/2010 | Archer et al. | |
| 2011/0079978 | A1 | 4/2011 | Schreiner et al. | |
| 2011/0114409 | A1 | 5/2011 | Venton-Walters | |
| 2011/0169240 | A1 | 7/2011 | Schreiner et al. | |
| 2014/0251742 | A1 | 9/2014 | Dillman et al. | |
| 2014/0326555 | A1 | 11/2014 | Ellifson et al. | |
| 2015/0290993 | A1 | 10/2015 | Dillman et al. | |

FOREIGN PATENT DOCUMENTS

| | | |
|---|---|---|
| DE | 41 16 399 | 11/1992 |
| EP | 0 818 332 | 1/1998 |
| GB | 0 215 58 | 3/1911 |

* cited by examiner

DAMPER ASSEMBLY

CROSS-REFERENCE TO RELATED PATENT APPLICATIONS

This application is a continuation of U.S. Application No. 17,462,924, filed Aug. 31, 2021, which is a continuation of U.S. application Ser. No. 16/517,209, filed Jul. 19, 2019, now U.S. Pat. No. 11,209,067, which is a continuation of U.S. application Ser. No. 15/707,675, filed Sep. 18, 2017, now U.S. Pat. No. 10,422,403, which is a continuation of U.S. application Ser. No. 14/846,600, filed Sep. 4, 2015, now U.S. Pat. No. 9,765,841, which is a continuation of U.S. application Ser. No. 13/047,648, filed Mar. 14, 2011, now U.S. Pat. No. 9,127,738, all of which are incorporated herein by reference in their entireties.

BACKGROUND

The present application relates general to the field of suspension systems for vehicles. More specifically the present application relates to hydraulic shock absorbers.

Dashpots, and more specifically dampers, function as shock absorbers for vehicles. The dampers are typically formed from hydraulic cylinders, such as double-acting cylinders. The hydraulic cylinder includes a rod end, a cap end, and a plunger (or piston) on an end of a rod. Movement of the plunger drives hydraulic fluid into and out of the rod and cap ends. Friction from movement of the hydraulic fluid through the cylinder and associated plumbing dissipates energy associated with actuation of the suspension system in a manner proportional to the velocity of the actuation.

SUMMARY

One exemplary embodiment relates to a damper assembly including an outer cylinder, an inner cylinder positioned at least partially within the outer cylinder, a cap coupled to the inner cylinder, and a plunger positioned radially inward from the inner cylinder and coupled to a rod. The plunger, the cap, and an interior of the inner cylinder at least partially define a first chamber. The suspension system further includes a passage extending through the rod and fluidly coupled with the first chamber, a piston coupled to the inner cylinder and extending radially outward toward the outer cylinder, a first port in fluid communication with the plunger, the cap, and the inner cylinder through the passage, and a second port in fluid communication with the piston, the inner cylinder, and the outer cylinder. The piston, an exterior surface of the inner cylinder, and the outer cylinder at least partially define a second chamber.

Another exemplary embodiment relates to a damper assembly including an outer cylinder, an inner cylinder positioned at least partially within the outer cylinder, a cap coupled to the inner cylinder, a plunger coupled to a rod, wherein the plunger, the cap, and the interior of the inner cylinder at least partially define a first chamber, and a piston coupled to the inner cylinder and extending radially outward toward the outer cylinder. The piston, an exterior surface of the inner cylinder, and the outer cylinder at least partially define a second chamber. The plunger prevents fluid from passing through the plunger between the inner cylinder and the rod.

Still another exemplary embodiment relates to a vehicle including a vehicle body and a suspension system coupled to the vehicle body. The suspension system includes a first damper having a variable volume and a second damper having a variable volume. The second damper includes a third chamber having a variable volume and a fourth chamber having a variable volume. The first chamber is fluidly coupled to the third chamber, and the second chamber is fluidly coupled to the fourth chamber.

Alternative exemplary embodiments relate to other features and combinations of features as may be generally recited in the claims.

BRIEF DESCRIPTION OF THE FIGURES

The disclosure will become more fully understood from the following detailed description, taken in conjunction with the accompanying figures, in which.

DETAILED DESCRIPTION

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Figure 1:
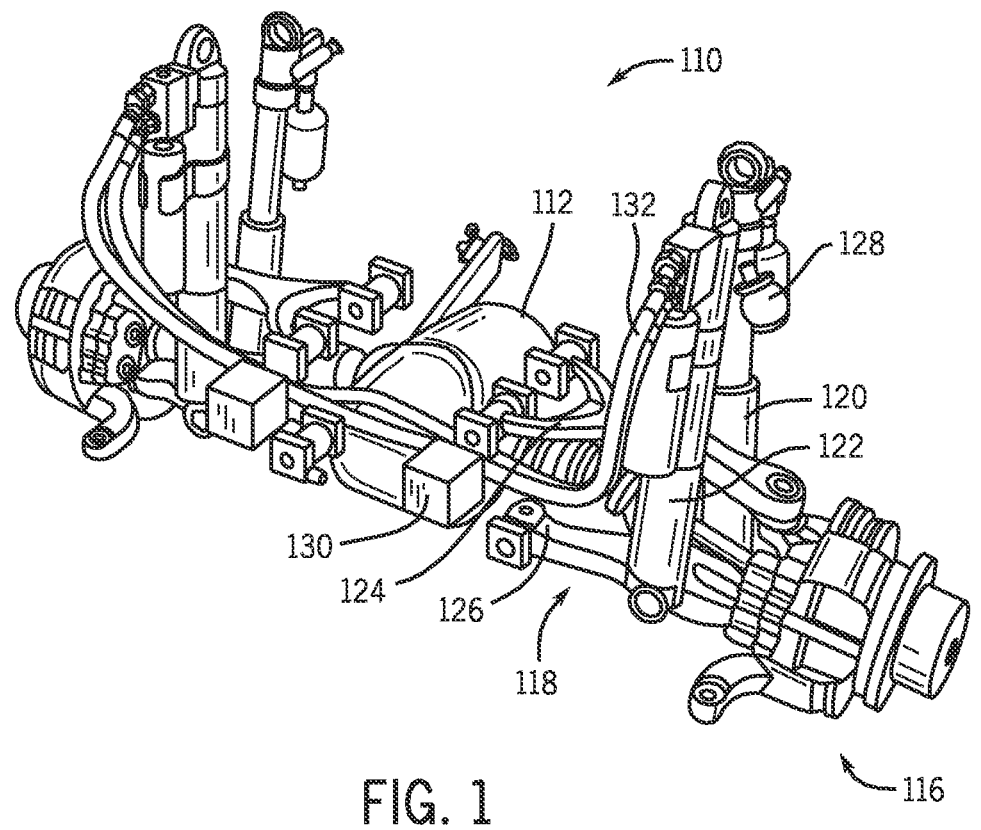
FIG. 1 is a perspective view of an axle assembly according to an exemplary embodiment of the invention.

Referring to FIG. 1, an axle assembly 110 is configured for use with a vehicle. The vehicle may be a military vehicle, a utility vehicle such as a fire truck, a tractor, construction equipment, a sport utility vehicle, or another type of vehicle. According to an exemplary embodiment, the axle assembly 110 includes a differential 112 connected to half shafts 114, which are each connected to a wheel end assembly 116. The wheel end assembly 116 may include brakes, a gear reduction, steering components, a wheel hub, a wheel, and other features. The differential 112 is further configured to be connected with a drive shaft of the vehicle, receiving rotational energy from a prime mover of the vehicle, such as a diesel engine. The differential 112 then allocates torque provided by the prime mover between the half shafts 114 of the axle assembly 110. The half shafts 114 deliver the rotational energy to each wheel-end assembly 116.

Movement of the wheel end assembly 116 is at least partially controlled by a suspension system 118. The suspension system 118 includes a spring 120, a damper 122, an upper support arm 124, and a lower support arm 126. The upper and lower support arms 124, 126 couple the wheel end assembly 116 to the vehicle body, such as to a chassis, a side plate, a hull, or another part of the vehicle body. According to an exemplary embodiment, the vehicle may be configured for operation on both paved and rough, off-road terrain. As the vehicle travels over uneven terrain, the upper and lower support arms 124, 126 guide the vertical movement of the wheel end assembly 116 and a stopper 128 provides an upper bound.

Figure 2:
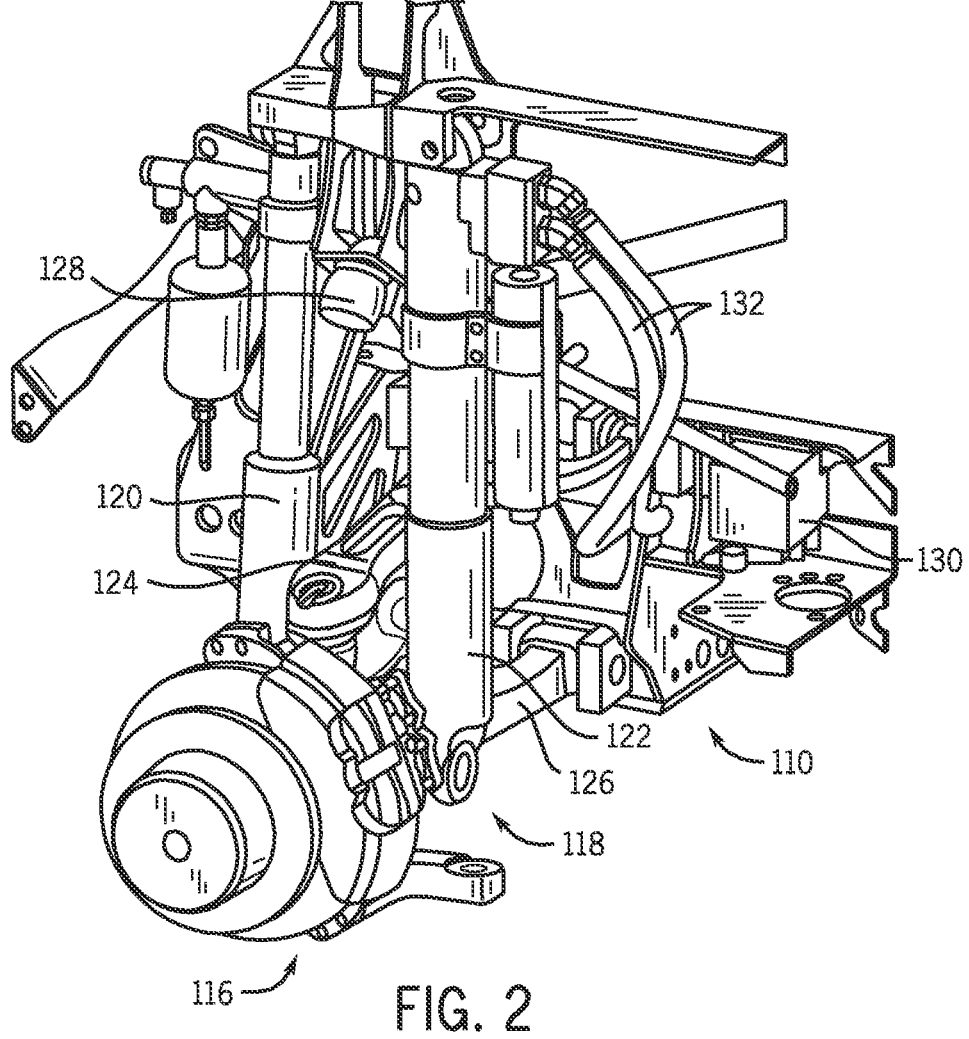
FIG. 2 is a perspective view of a suspension system of the axle assembly of FIG. 1.

Referring to FIG. 2, according to an exemplary embodiment the suspension system 118 includes one or more high-pressure gas or hydraulic fluid components. In some embodiments, the spring 120 is a high-pressure gas spring 120. In such embodiments, the suspension system 118 further includes at least one high-pressure gas pump 130, such as a separate high-pressure gas pumps 130 associated with each spring 120. In preferred embodiments, the gas of the pump 130 and spring 120 is at least 90% formed from an inert gas, such as nitrogen, argon, helium, etc., which may be stored, provided, or received in one or more reservoirs (e.g., central reservoir, tank). During operation, the pump 130 selectively provides gas, under pressure, to the high-pressure gas spring 120 and/or to reservoirs, tanks, accumulators, or other devices. In some embodiments, additional fluid (e.g., gas, hydraulic fluid) may be pumped to the springs 120 and/or the dampers 122 to change the ride height of the vehicle by lifting or lowering the body of the vehicle with respect to the ground.

Figures 3, 4:
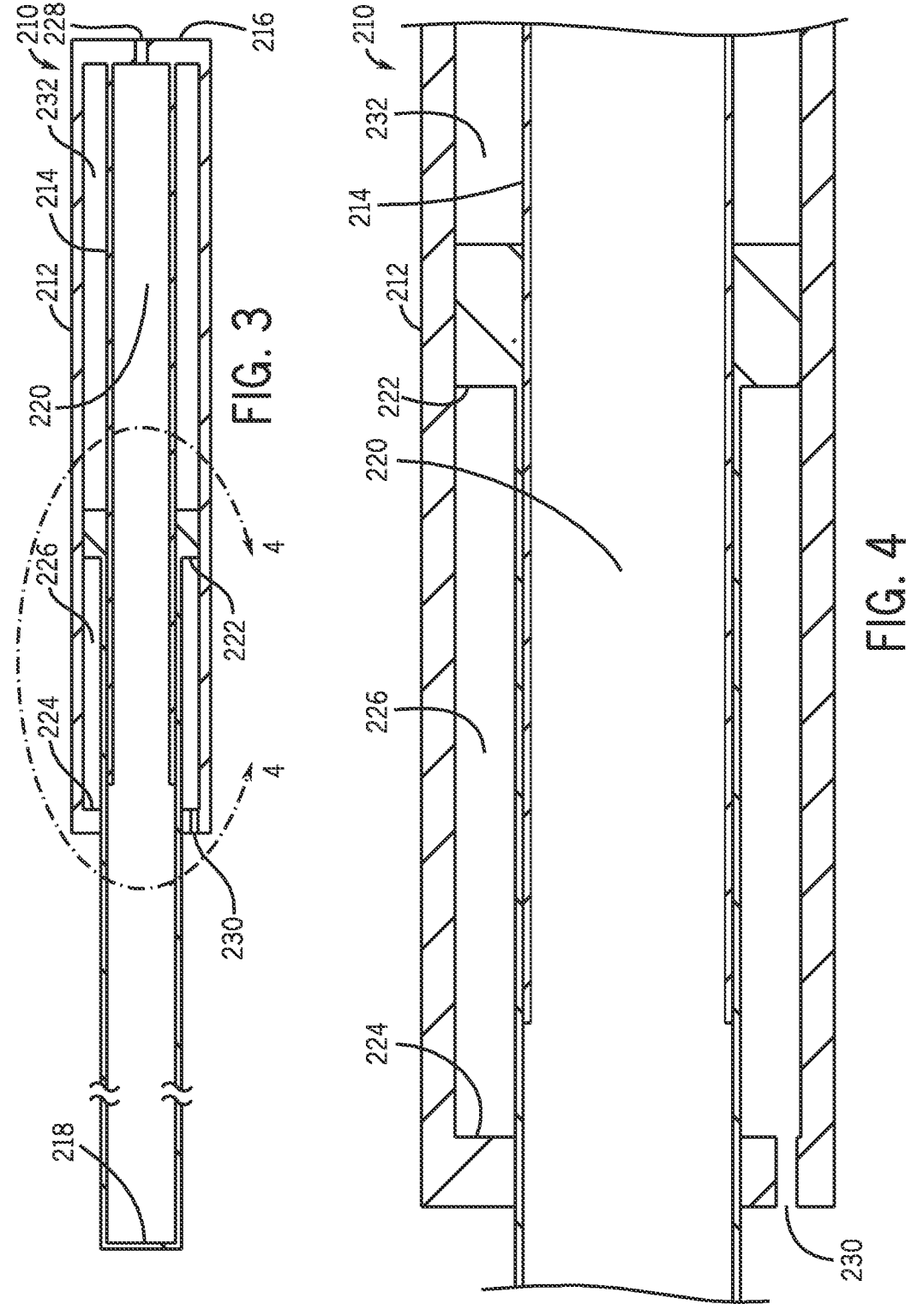
FIG. 3 is a sectional view of a damper according to an exemplary embodiment of the invention.
FIG. 4 is a sectional view of the damper of FIG. 3, taken along line 4-4 as shown in FIG. 3.

Referring now to FIGS. 3-4, a damper assembly 210 (e.g., damper) may be used with a suspension system (see, e.g., suspension system 118 of FIGS. 1-2), and includes an outer cylinder 212 and an inner cylinder 214. The inner cylinder 214 is at least partially positioned within the outer cylinder 212. According to an exemplary embodiment, a cap 216 (FIG. 3) closes (e.g., seals, caps) one end of each of the inner and outer cylinders 214, 212. The inner cylinder 214 is received within a plunger 218 that moves relative to the inner cylinder 214. As such, a first chamber 220 is at least partially defined by the plunger 218, the cap 216, and an interior of the inner cylinder 214. Movement of the plunger 218 relative to the inner cylinder 214 changes the volume of the first chamber 220.

Figures 7, 8:
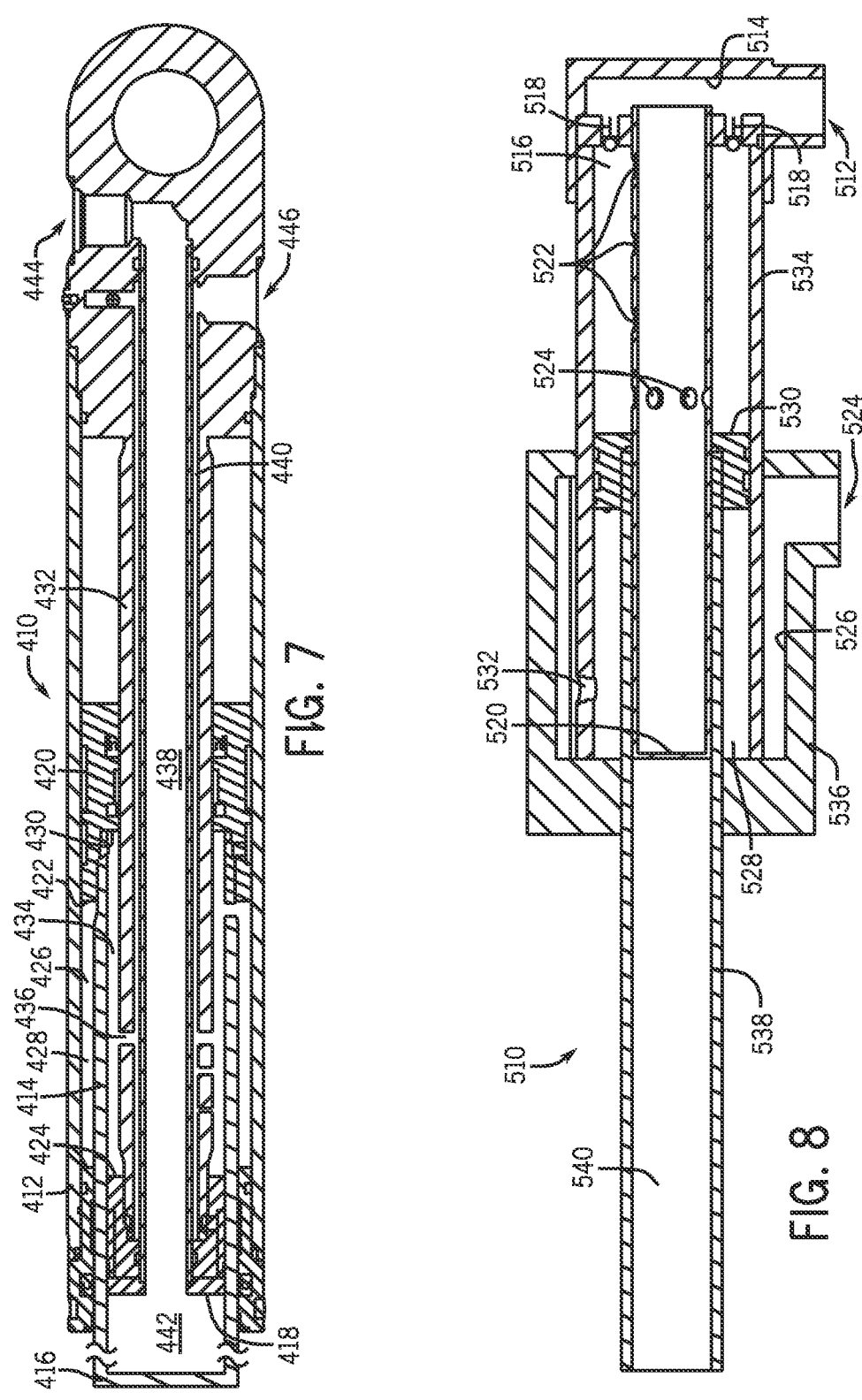
FIG. 7 is a sectional view of a damper according to yet another exemplary embodiment of the invention.
FIG. 8 is a sectional view of a damper according to still another exemplary embodiment of the invention.

According to an exemplary embodiment, the damper assembly 210 further includes an annular piston 222, which moves relative to the outer cylinder 212. The annular piston 222 is round and includes a ring-shaped cross-section. At least a portion of the annular piston 222 transversely extends between the inner and outer cylinders 214, 212. A barrier 224, such as a rod-end head or rod gland, also transversely extends between the inner and outer cylinders 214, 212. A second chamber 226 is at least partially defined by the barrier 224, the annular piston 222, an exterior surface of the inner cylinder 214, and the outer cylinder 212. The second chamber 226 is an annular chamber, and may include one or more sub-chambers divided by structural partitions, but in fluid communication with one another (see generally second chamber 428 as shown in FIG. 7).

According to an exemplary embodiment, the damper assembly 210 further includes a first aperture 228 (e.g., opening, hole, conduit) associated with the first chamber 220 and a second aperture 230 associated with the second chamber 226. In some embodiments, the first aperture 228 is formed in the cap 216 and is connected to external transfer tubes or pipes (see generally hydraulic lines 132 as shown in FIGS. 1-2). The first aperture 228 allows fluid (e.g., hydraulic fluid, oil, gas, etc.) to flow into and out of the first chamber 220.

Figure 9:
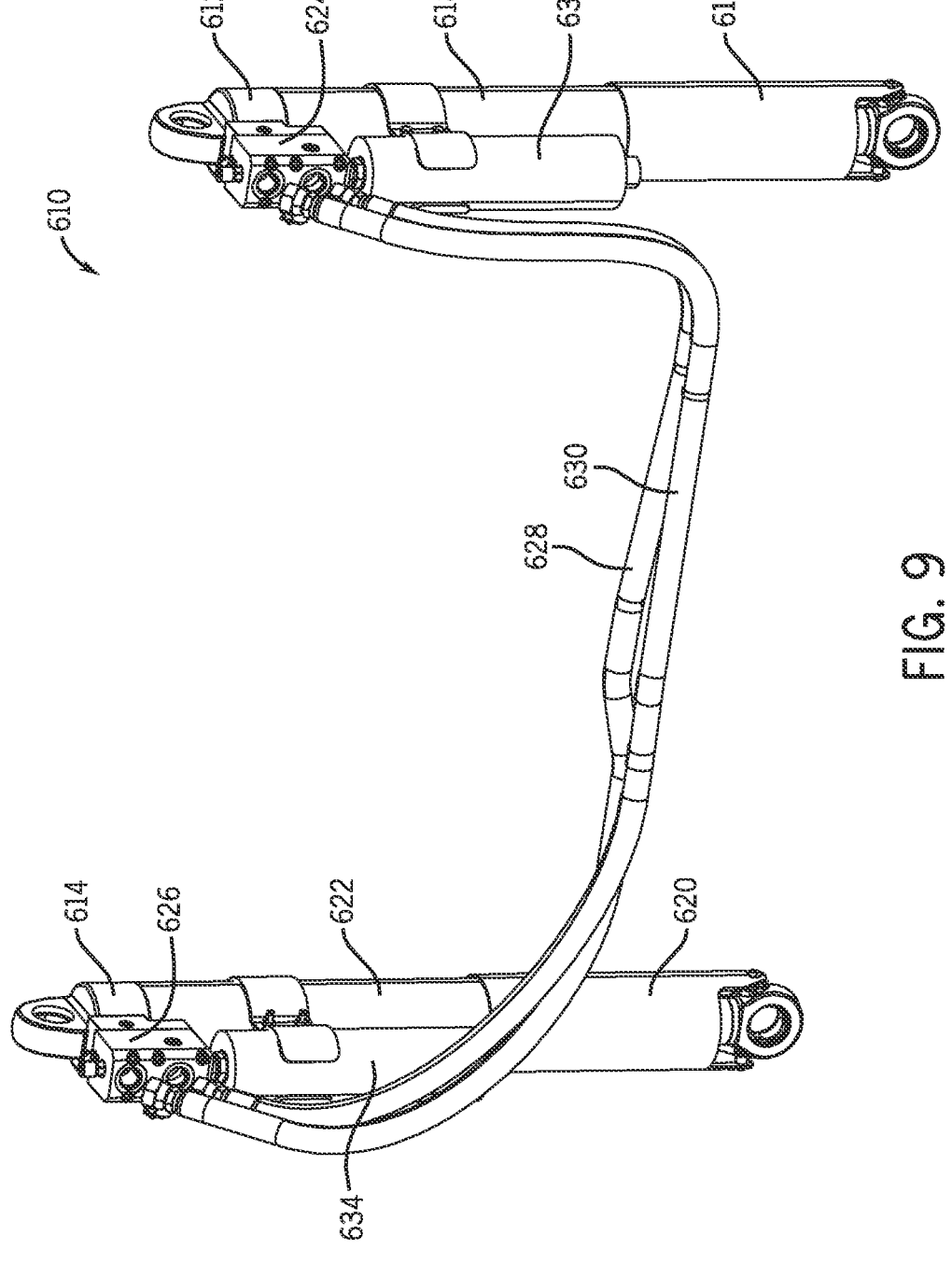
FIG. 9 is a perspective view of dampers of the axle assembly of FIG. 1.

In some embodiments, the second aperture 230 is formed in the barrier 224 and is connected to external transfer tubes or pipes. The second aperture 230 allows fluid to flow into and out of the second chamber 226. Either or both of the first and second apertures 228, 230 may include valves (e.g., directional-control valves; see, generally modular valve assembly 624, 626 as shown in FIG. 9). In other contemplated embodiments, the damper assembly 210 functions as a spring or an accumulator, and the first or the second chamber 220, 226 may not include an aperture.

Figure 5:
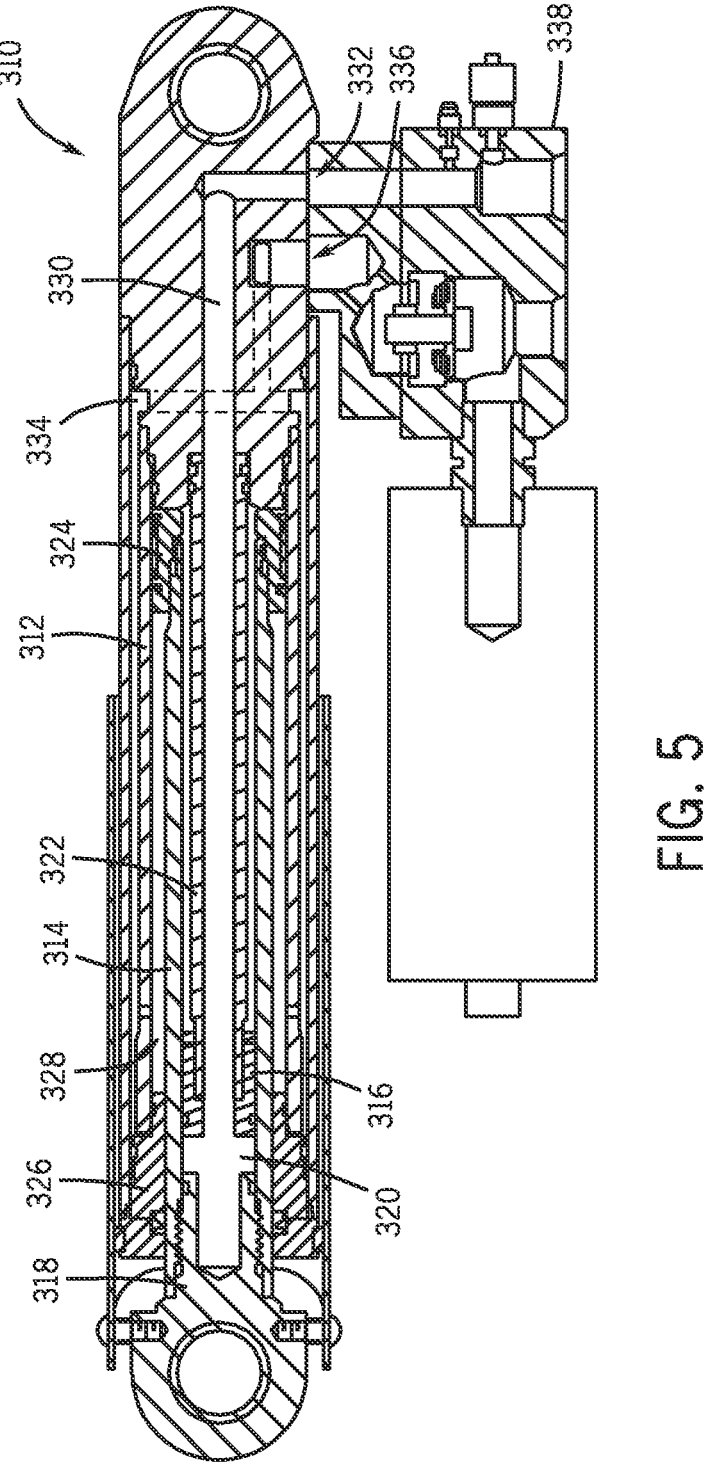
FIG. 5 is a sectional view of a damper according to another exemplary embodiment of the invention.

Still referring to FIGS. 3-4, the annular piston 222 is fixed to the plunger 218. As the plunger 218 moves forward, pushing fluid out of the first chamber 220, the annular piston 222 also moves forward at the same rate, pulling fluid into the second chamber 226. In other embodiments, the annular piston 222 is fixed to the inner cylinder 214, which may move relative to both the plunger 218 and to the outer cylinder 212 (see generally annular piston 324 and inner cylinder 314 as shown in FIG. 5).

According to an exemplary embodiment, the portion of the plunger 218 at least partially defining the first chamber 220 has a cross-sectional area that is substantially equal to that of the portion of the annular piston 222 at least partially defining the second chamber 226 (e.g., one-to-one working area ratio). As such, the rate of volume change within the first chamber 220, as the plunger 218 moves, matches the rate of volume change within the second chamber 226 as the annular piston 222 moves. Correspondingly, in such an embodiment the rate of hydraulic fluid out of one chamber 220, 226 matches the rate of hydraulic fluid entering the other chamber 226, 220.

In a configuration in which the damper assembly 210 is used independently, not cross-linked with another damper, the first aperture 228 may be coupled to the second aperture 230. Hydraulic fluid from one of the first and second chambers 220, 226 may flow directly to the other of the first and second chambers 220, 226 without use of an intermediate accumulator or reservoir, and without using a double-rod end cylinder configuration. No make-up volume of hydraulic fluid is required.

In another embodiment, a third chamber 232 is at least partially defined by the cap 216, the interior of the outer cylinder 212, the exterior of the inner cylinder 214 and the annular piston 222. As shown in FIG. 4, the side of the annular piston 222 that is at least partially defining the third chamber 232 has about a twenty-five percent larger working area than the side of the annular piston 222 that is defining the second chamber 226. In contemplated embodiments, the second and third chambers 226, 232 may contain hydraulic fluid, with the first chamber 220 forming a vacuum, containing inert gas, or in communication with ambient air. In such embodiments, the extend-to-retract area ratio is about 1-to-1.25 (e.g., near equal area). In designs where the outer diameter of the inner cylinder 214 and the inner diameter of the outer cylinder 212 increase, the extend-to-retract area may more closely approximate a 1-to-1 ratio.

Figure 6:
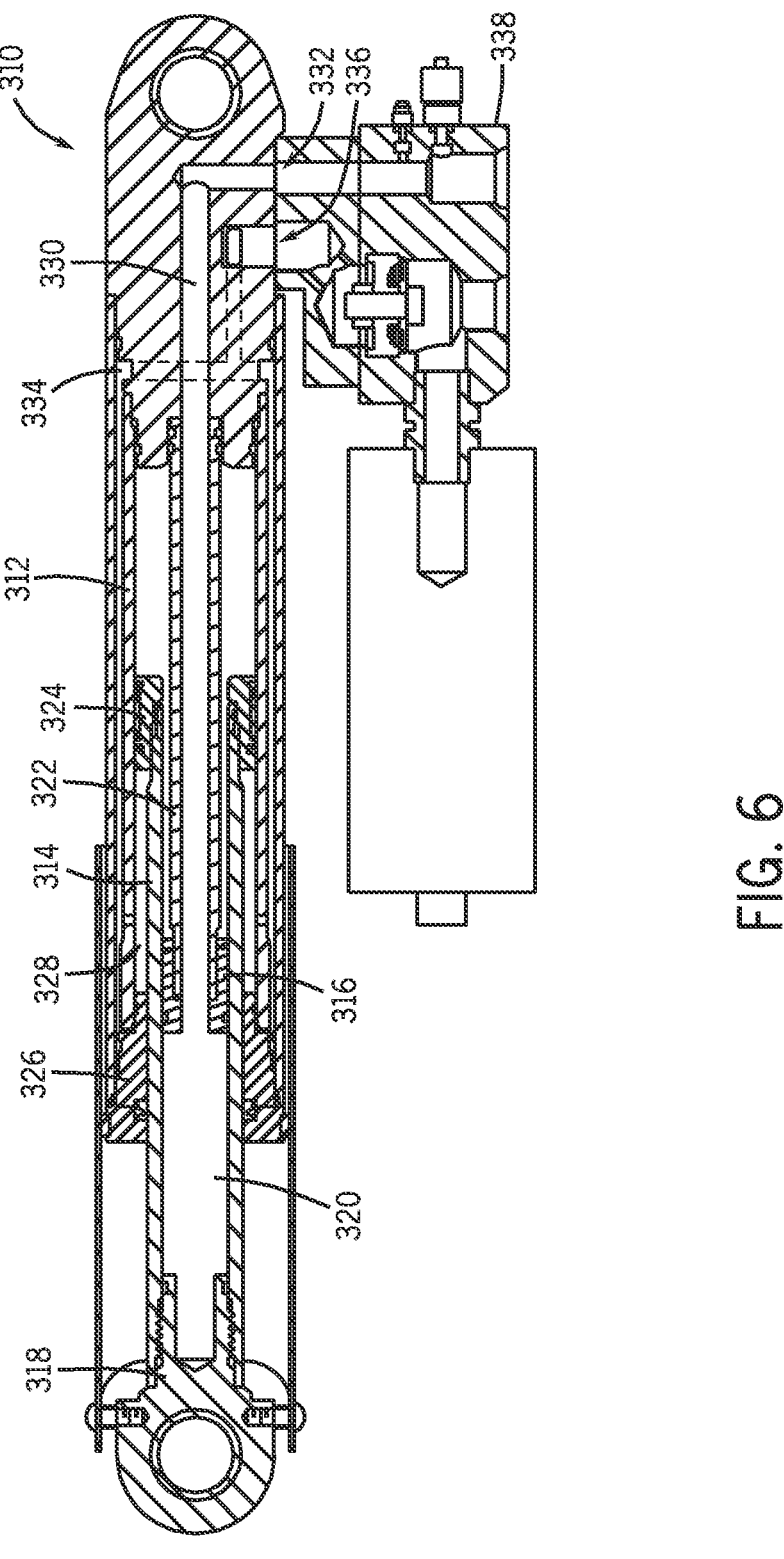
FIG. 6 is a sectional view of the damper of FIG. 5, in another configuration.

Referring to FIGS. 5-6 a damper assembly 310, as may be used with the suspension system 118 of FIGS. 1-2, includes an outer cylinder 312 and an inner cylinder 314. The inner cylinder 314 is positioned at least partially within the outer cylinder 312 and a plunger 316 is received in the inner cylinder 314. A cap 318 closes the end of the inner cylinder 314 on a side of the inner cylinder 314 that is opposite to the plunger 316, such that a first chamber 320 is at least partially defined by the face of the plunger 316, the cap 318, and the interior of the inner cylinder 314. Movement (e.g., translation) of the plunger 316 relative to the inner cylinder 314 changes the volume of the first chamber 320. According to an exemplary embodiment, a rod 322 is fixed to the plunger 316 and extends at least partially within the inner cylinder 314. In some such embodiments, the rod 322 is fixed to the outer cylinder 312.

The damper assembly 310 further includes an annular piston 324 fixed to the inner cylinder 314 on an end of the inner cylinder 314 opposite to the cap 318. As such, during operation of the damper assembly 310, the annular piston 324 moves with the inner cylinder 314 relative to both the outer cylinder 312 and the rod 322. The annular piston 324 and a barrier 326 transversely extend between the inner and outer cylinders 314, 312, and a second chamber 328 is at least partially defined by the barrier 326, the annular piston 324, the exterior of the inner cylinder 314, and the interior of the outer cylinder 312. According to an exemplary embodiment, the plunger 316 has a cross-sectional area that is substantially equal to the cross-sectional area of the portion of the annular piston 324 that is at least partially defining the second chamber 328 (i.e., one-to-one working area ratio).

The damper assembly 310 includes a first aperture 330 (e.g., conduit, tunnel, passage) coupling the first chamber 320 to a first port 332 located on the exterior of the damper assembly 310, and a second aperture 334 coupling the second chamber 328 to a second port 336 also located on the exterior of the damper assembly 310. According to an exemplary embodiment, the first and second ports 332, 336 are proximate to one another, allowing for coupling of a modular valve assembly 338 (FIG. 6) or another attachment to the damper assembly 310 that may simultaneously access the first and second chambers 320, 328 via the first and second ports 332, 336.

According to an exemplary embodiment, the first aperture 330 extends from the first port 332 through the rod 322 and the plunger 316 to the first chamber 320. The second aperture 334 extends from the second port 336, through the interior to the outer cylinder 312 to the second chamber 328. In some embodiments, the second aperture 334 extends along an outside portion of the second chamber 328, while in other embodiments, the second aperture 334 extends along an inside portion of the second chamber 328, such as being integrated with the rod 322 (see, e.g., aperture 440 as shown in FIG. 7).

During operation of the damping assembly 310, fluid flows into the first port 332, through the first aperture 330 in the rod 322 and the plunger 316, and into the first chamber 320. The inner cylinder 314 slides away from the plunger 316, and the volume of the first chamber 320 increases. Simultaneously the annular piston 324 slides toward the barrier 326, decreasing the volume of the second chamber 328. Fluid flows from the second chamber 328, through the second aperture 334 and to the second port 336. Compare the damper assembly 310 in a retracted configuration as shown in FIG. 5 with the damper assembly 310 in an extended configuration as shown in FIG. 6. When the damper assembly 310 is used independently and not cross-linked with another damper, the first aperture 330 may be coupled to the second aperture 334, and hydraulic fluid from one of the first and second chambers 320, 328 may flow directly to the other of the first and second chambers 320, 328.

Referring now to FIG. 7, a damper assembly 410, according to another embodiment, includes an outer cylinder 412, an inner cylinder 414 having a cap 416, and a plunger 418 received in the inner cylinder 414. A first chamber 442 is at least partially defined by the inner cylinder 414, the cap 416, and the face of the plunger 418. An annular piston 420 is fixed to the inner cylinder 414 on an end of the inner cylinder 414 opposite to the cap 416. A first part 422 of the annular piston 420 and a barrier 424 both transversely extend between the inner and outer cylinders 414, 412. A first portion 426 (e.g., sub-chamber) of a second chamber 428 is at least partially defined by the barrier 424, the first part 422 of the annular piston 420, the exterior of the inner cylinder 414, and the interior of the outer cylinder 412.

The damper assembly 410 of FIG. 7 further includes a second part 430 of the annular piston 420, which transversely extends between the inner cylinder 414 and a rod 432 fixed to the plunger 418. As such, the second chamber 428 includes a second portion 434 that is at least partially defined by the rod 432, the second part 430 of the annular piston 420, the interior of the inner cylinder 414, and the rear of the plunger 418. The first and second portions 426, 434 of the second chamber 428 are in fluid communication with one another such that hydraulic fluid from one of the portions 426, 434 may flow to the other, and vice versa, through an opening 436. According to an exemplary embodiment, the face of plunger 418 has a cross-sectional area that is substantially equal to the net cross-sectional area of the parts 422, 430 of the annular piston 420 that are at least partially defining the first and second portions 426, 434 of the second chamber 428.

Apertures 438, 440 are formed in the damper assembly 410 corresponding to each of the chambers 428, 442. The aperture 438 associated with the first chamber 442 extends through the rod 432 and connects the first chamber 442 with a first port 444. The aperture 440 associated with the second chamber 428 extends through the rod 432 and connects the second chamber 428 with a second port 446. The first and second ports 444, 446 are on opposite sides of the damper assembly 410.

Referring now to FIG. 8, a damper assembly 510 is designed for position-dependent damping. The damper assembly 510 includes a first port 512, which may be connected to external compression valving (see, e.g., modular valve assembly 338 as shown in FIG. 6). A first aperture 514 connects the first port 512 to a first chamber 516 (e.g., extension flow collection volume). A deflected disc check valve 518 is positioned between the first aperture 514 and the first chamber 516, allowing flow into the first chamber 516 and preventing flow out of the first chamber 516.

A plunger 520 at least partially defines the first chamber 516, which includes primary flow openings 524 and a series of auxiliary openings 522 for changing the damping response as a function of the number of the auxiliary openings 522 in operation. More auxiliary openings 522 in operation provide lesser resistance to the flow. The operability of the auxiliary openings 522 depends upon the relative configuration of the plunger 520 within the first chamber 516, which corresponds with the degree to which the damper assembly 510 is extended.

The damper assembly 510 further includes a second port 524, which may be connected to external recoil valving. A second aperture 526 connects the second port 524 to a second chamber 528 (e.g., recoil flow collection volume) of the damper assembly 510. According to an exemplary embodiment, an annular piston 530 is associated with the second chamber 528. The second chamber 528 also includes one or more position-dependent recoil flow ports 532.

Similar to the damper assemblies 210, 310, and 410, the damper assembly 510 includes an inner cylinder 534 and an outer cylinder 536. However, only a portion of the inner cylinder 534 (e.g., less than half) extends within the outer cylinder 536. Also, a rod 538 of the damper assembly 510 is hollow and includes an empty volume 540. In contemplated embodiments, the empty volume 540 may be used to support a gas spring (see, e.g., spring 120 as shown in FIG. 1) or a portion thereof, integrating the gas spring with the hydraulic damper 510.

Referring to FIG. 9, a damper set 610 (e.g., system), configured for use with the axle assembly 110, includes at least two dampers, such as a first damper 612 and a second damper 614. According to an exemplary embodiment, each damper 612, 614 includes two chambers 616, 618, 620, 622, such as rod-end chambers 616, 620 and cap-end chambers 618, 622 (see, e.g., chambers 320, 328 as shown in FIG. 5). Each chamber 616, 618, 620, 622 includes a surface or wall that moves to change the volume of the chamber, such as a piston or plunger (see, generally plunger 316 and annular piston 324 as shown in FIG. 5). Within each damper 612, 614 the movable surfaces of the two chambers 616, 618 and 620, 622 may be formed on opposite sides of the same element (e.g., a piston), or may be surfaces of separate elements (e.g., two different pistons). According to an exemplary embodiment, the movable surfaces of each of the chambers 616, 618, 620, 622 in the damper set 610 have substantially the same cross-sectional area (e.g., working area).

According to an exemplary embodiment, the damper set includes a modular valve assembly 624, 626 fastened to each damper 612, 614. The modular valve assemblies 624, 626 include valves (e.g., passive valving, piston valve, deflected disc blow-off valve acting on the rebound side) that control fluid flow to and from the chambers 616, 618 and 620, 622 of associated dampers 612, 614. In contemplated embodiments, the modular valve assemblies 624, 626 may be controlled by a computerized controller and may be configured to operate the damper set 610 in different modes depending upon loading of the associated vehicle (e.g., controlling damping stiffness and response as a function of axle load and/or terrain). In some embodiments, the modular valve assemblies 624, 626 are designed to be easily switchable with other modular valve assemblies including different strength valves, depending upon axle load or other factors. According to an exemplary embodiment, the modular valve assemblies 624, 626 are bolted to the dampers 612, 614, such as over ports associated with the chambers 616, 618, 620, 622 of the dampers 612, 614 (see, e.g., ports 332, 336 as shown in FIGS. 5-6).

According to an exemplary embodiment, the dampers 612, 614 of the damper set 610 are cross-plumbed (e.g., cross-linked). Hydraulic lines 628, 630 connect opposite chambers 618, 620 and 616, 622 of different dampers 612, 614, such as connecting a rod-end of one damper with a cap-end of another damper on an opposite side of the axle assembly 110. The dampers 612, 614 may be cross-plumbed in a "walking beam" configuration for a tandem axle, and/or between dampers 122 on separate axle assemblies of the vehicle (e.g., between dampers located front-to-back, or diagonally located with respect to each other, etc.). In some such embodiments, the hydraulic lines 628, 630 are coupled to the dampers 612, 614 by way of the modular valve assemblies 624, 626.

In some embodiments, each hydraulic line 628, 630 includes an associated accumulator 632, 634. The accumulators 632, 634 may be fastened to the dampers 612, 614, or may be located elsewhere in the axle assembly 110. According to an exemplary embodiment, the accumulators 632, 634 may be used with the modular valve assemblies 624, 626 to operate the damper set 610 in different modes, depending upon loading, terrain, speed, etc. of the associated vehicle.

According to an exemplary application, as the vehicle turns, the damper 612 on the inside of the turn retracts. Retraction of the damper 612 increases pressure in the cap-end chamber 618 and decreases pressure in the rod-end chamber 616 of the damper 612. Concurrently, the damper 614 on the outside of the turn receives and supplies the hydraulic fluid of the damper 612. Hydraulic fluid is transferred from the cap-end chamber 618 of the damper 612 to the rod-end chamber 620 of the damper 614, and from the cap-end chamber 622 of the damper 614 to the rod-end chamber 616 of the damper 612.

In general, without use of a double-rod cylinder providing equal areas to both sides of a plunger, pressure applied by the cap end of a conventional hydraulic damper is greater than the pressure applied by the rod end, which may raise or lower the chassis of the vehicle going around a turn. Use of a double rod-end cylinder may help prevent vehicle lifting, but the double rod-end cylinder typically requires a larger travel than a single rod-end cylinder, and may not be compatible with a compact suspension. However, because the moveable surfaces of each of the chambers 616, 618, 620, 622 in the damper set 610 have substantially the same cross-sectional area, the pressure applied by the cap-end chamber 618 of the damper 612 is oppositely applied to the rod-end chamber 620 of the damper 614. Equal and opposite pressures are intended to improve the ride quality of the associated vehicle by preventing lifting of the vehicle as the vehicle turns, such as raising and lowering of the chassis by unequal pressures loading the dampers 612, 614.

In contemplated embodiments, the cap-end chambers 618, 622 and the rod-end chambers 616, 620 of the dampers 612, 614 may be coupled via the hydraulic lines 628, 630. In still other embodiments, the modular valve assemblies 624, 626 allow for switching of the chambers 616, 618, 620, 622 that are respectively coupled, such as from cap-end chamber 618 and rod-end chamber 620 to cap-end chamber 618 and cap-end chamber 622. The switching may be directed via the computerized controller, which may be manually controlled from the cabin of the associated vehicle by an operator and/or automatically controlled by the computerized controller as a function of location, speed, vehicle tilt, etc.

Figure 10:
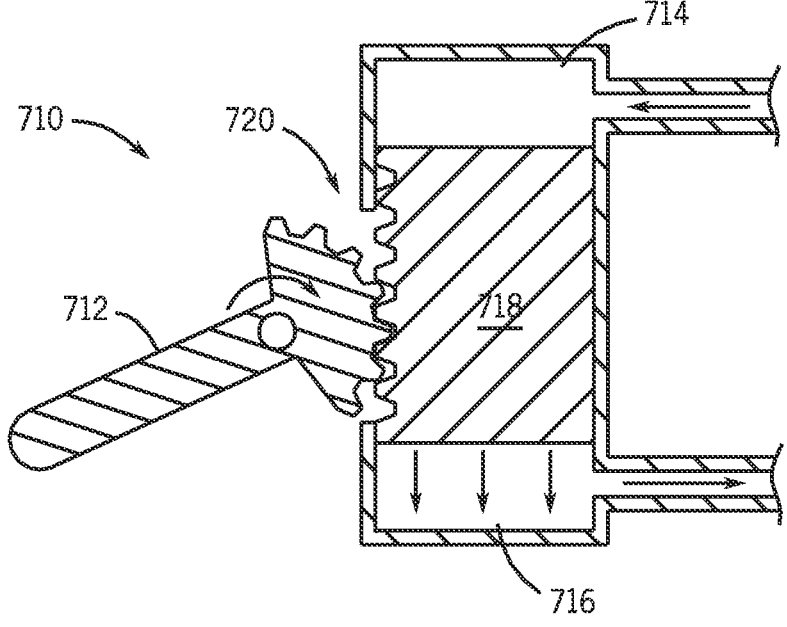
FIG. 10 is a schematic diagram of a vehicle suspension system and a damper according to another exemplary embodiment of the invention.

Referring now to FIG. 10, a damper assembly 710 is designed for use with a rotary actuator 712 (e.g., steering gear). The damper assembly 710 includes two chambers 714, 716 on opposing sides of a piston 718. The piston 718 is coupled to the rotary actuator 712 via a rack-and-pinion gear arrangement 720. As such, the damper assembly 710 dissipates rotary energy and provides equal pressure for hydraulic fluid on both sides of the piston 718. In a configuration in which the damper assembly 710 is used independently, the first chamber 714 may be coupled to the second chamber 716, and hydraulic fluid from one of the first and second chambers 714, 716 may flow directly to the other of the first and second chambers 714, 716, without use of an intermediate accumulator or reservoir (i.e., no make-up volume required).

The dampers 210, 310, 410, 510, and 710 are each configured to operate in a damper set, such as the damper set 610, which may be part of an axle assembly for a vehicle, such as the axle assembly 110. Additionally, the dampers 210, 310, 410, 510, and 710 are configured to operate in other applications, such as with landing gears of airplanes, suspension systems of railroad cars, and other industrial machinery. Further, the innovations described herein may be used with dampers and damping systems associated with large structures, such as buildings and bridges, to dissipate energy of an earthquake, wind, rough seas, etc.

The construction and arrangements of the damper assembly, as shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present invention.

The invention claimed is:

1. A damper assembly comprising:
an outer cylinder at least partially defining a fluid flow path therewithin;
an inner cylinder positioned at least partially within the outer cylinder;
a cap coupled to the inner cylinder;
a plunger positioned radially inward from the inner cylinder and coupled to a rod, wherein the plunger, the cap, and an interior of the inner cylinder at least partially define a first chamber;
a passage extending through the rod and fluidly coupled with the first chamber;
a piston coupled to the inner cylinder and extending radially outward toward the outer cylinder, wherein the piston, an exterior surface of the inner cylinder, and the outer cylinder at least partially define a second chamber;
a barrier coupled to the outer cylinder and extending radially inward toward the inner cylinder, wherein the barrier prevents fluid flow between outer cylinder and the barrier;
a fluid passage opening defined in the outer cylinder, the fluid passage opening fluidly connecting the second chamber and the fluid flow path within the outer cylinder, the fluid passage opening spaced a distance apart from the barrier in a direction away from the cap, wherein an outer circumferential surface of the piston is configured to move along an interior surface of the outer cylinder and at least partially across the fluid passage opening;
a first port in fluid communication with the plunger, the cap, and the inner cylinder through the passage; and
a second port in fluid communication with the piston, the inner cylinder, the outer cylinder, and the second chamber.

2. The damper assembly of claim 1, wherein the first port is located on an exterior of the damper assembly, and wherein the second port is located on the exterior of the damper assembly.

3. The damper assembly of claim 1, wherein the plunger is configured to move relative to the inner cylinder, and wherein the piston is configured to move relative to the outer cylinder.

4. The damper assembly of claim 3, wherein the plunger is fixed to an end portion of the rod, and wherein movement of the plunger relative to the inner cylinder changes a volume of the first chamber.

5. The damper assembly of claim 4, wherein the movement of the plunger relative to the inner cylinder moves the piston relative to the outer cylinder and changes a volume of the second chamber.

6. The damper assembly of claim 5, wherein when the volume of the first chamber increases, the volume of the second chamber decreases.

7. The damper assembly of claim 1, wherein the barrier at least partially defines the second chamber.

8. The damper assembly of claim 7, further comprising an accumulator in fluid communication with at least one of the first chamber and the second chamber.

9. The damper assembly of claim 8, wherein the first chamber is at least partially defined by a face of the plunger, and wherein the face of the plunger has a cross-sectional area that is substantially equal to the cross-sectional area of a portion of the piston that at least partially defines the second chamber.

10. The damper assembly of claim 1, wherein the inner cylinder includes internal threads and a stem of the cap includes external threads adjustably received within the internal threads.

11. The damper assembly of claim 1, wherein each of the first chamber, the second chamber, and the fluid flow path receive hydraulic fluid.

12. The damper assembly of claim 1, wherein the rod has an outer diameter that is smaller than an inner diameter of the inner cylinder.

13. A damper assembly comprising:
an outer cylinder at least partially defining a fluid flow path therewithin, the fluid flow path containing a hydraulic fluid;
an inner cylinder positioned at least partially within the outer cylinder;
a cap coupled to the inner cylinder;
a plunger coupled to a rod, wherein the plunger, the cap, and an interior of the inner cylinder at least partially define a first chamber, wherein the plunger extends across a gap between the inner cylinder and the rod, and wherein the plunger prevents fluid from passing through the plunger between the inner cylinder and the rod;
a piston coupled to the inner cylinder and extending radially outward toward the outer cylinder, and wherein the piston, an exterior surface of the inner cylinder, and the outer cylinder at least partially define a second chamber; and
a barrier coupled to the outer cylinder and extending radially inward toward the inner cylinder, wherein the barrier prevents fluid flow between outer cylinder and the barrier; and
a fluid passage opening defined in the outer cylinder, the fluid passage opening fluidly connecting the second chamber and the fluid flow path within the outer cylinder, the fluid passage opening spaced a distance apart from the barrier in a direction away from the cap, and wherein the piston is configured to move along an interior surface of the outer cylinder and at least partially across the fluid passage opening.

14. The damper assembly of claim 13, wherein relative displacement between the inner cylinder and the outer cylinder in a first direction increases a volume of the first chamber and decreases a volume of the second chamber.

15. The damper assembly of claim 14, wherein relative displacement between the inner cylinder and the outer cylinder in a second direction opposite the first direction decreases the volume of the first chamber and increases the volume of the second chamber.

16. The damper assembly of claim 13, wherein the plunger is fixed to an end of the rod, and wherein movement of the plunger relative to the inner cylinder changes a volume of the first chamber.

17. The damper assembly of claim 16, wherein the barrier at least partially defines the second chamber.

18. A vehicle, comprising:

a vehicle body; and a suspension system coupled to the vehicle body, the suspension system comprising:

a first damper comprising:

an inner cylinder extending within an outer cylinder, the outer cylinder at least partially defining a fluid flow path therewithin;

a rod extending within the inner cylinder, an annular gap extending between an outer surface of the rod and an inner surface of the inner cylinder;

a plunger coupled to the rod, extending within the inner cylinder and across the annular gap, and movable relative to the inner cylinder;

a first chamber at least partially defined by the plunger and the inner cylinder; and a second chamber at least partially defined by an exterior surface of the inner cylinder, the outer cylinder, and a piston coupled to the inner cylinder and extending radially outward toward the outer cylinder;

a barrier coupled to the outer cylinder and extending radially inward toward the inner cylinder, wherein the barrier prevents fluid flow between outer cylinder and the barrier; and a fluid passage opening defined in the outer cylinder, the fluid passage opening connecting the second chamber and the fluid flow path within the outer cylinder, the fluid passage opening spaced a distance apart from the barrier, wherein the piston is configured to move along an interior surface of the outer cylinder and at least partially across the fluid passage opening; and a second damper comprising:

a third chamber having a variable volume; and a fourth chamber having a variable volume, wherein the first chamber is fluidly coupled to the third chamber through the plunger; and wherein the second chamber is fluidly coupled to the fourth chamber.

19. The vehicle of claim 18, wherein the suspension system further comprises:

a first accumulator coupled to a first conduit, the first conduit coupling the first chamber to the third chamber to facilitate fluid communication therebetween; and a second accumulator coupled to a second conduit, the second conduit coupling the second chamber to the fourth chamber to facilitate fluid communication therebetween, wherein a response of the first damper and the second damper is at least partially controlled via operation of the first accumulator and the second accumulator.

20. The damper assembly of claim 1, wherein the barrier is either a rod-end head or a rod gland.

* * * * *